(12) United States Patent
Iizuka et al.

(10) Patent No.: US 8,976,450 B2
(45) Date of Patent: Mar. 10, 2015

(54) OPTICAL LIGHT SWITCH HAVING TWO INTERNALLY LOCATED DIFFRACTION GRATINGS SEPARATED BY LIQUID MEDIUM

(75) Inventors: Hideo Iizuka, Ann Arbor, MI (US); Nader Engheta, Berwyn, PA (US); Hisayoshi Fujikawa, Seto (JP)

(73) Assignees: Toyota Motor Engineering & Manufacturing North America, Inc., Erlanger, KY (US); The Trustees of the University of Pennsylvania, Philadelphia, PA (US)

( * ) Notice: Subject to any disclaimer, the term of this patent is extended or adjusted under 35 U.S.C. 154(b) by 1008 days.

(21) Appl. No.: 13/079,339

(22) Filed: Apr. 4, 2011

(65) Prior Publication Data
US 2011/0181957 A1 Jul. 28, 2011

Related U.S. Application Data

(63) Continuation-in-part of application No. 12/692,688, filed on Jan. 25, 2010, now Pat. No. 8,072,684.

(51) Int. Cl.
G02B 5/18 (2006.01)
G02B 26/02 (2006.01)
G02B 26/08 (2006.01)

(52) U.S. Cl.
CPC ............ *G02B 26/02* (2013.01); *G02B 26/0808* (2013.01)
USPC .......................................... 359/573; 359/576

(58) Field of Classification Search
USPC ....................................................... 359/576
See application file for complete search history.

(56) References Cited

U.S. PATENT DOCUMENTS

| | | | |
|---|---|---|---|
| 4,331,972 | A | 5/1982 | Rajchman |
| 4,402,610 | A | 9/1983 | Lacombat |
| 4,729,640 | A | 3/1988 | Sakata |
| 4,781,442 | A | 11/1988 | Koster et al. |
| 5,430,561 | A | 7/1995 | Kato et al. |
| 5,434,434 | A | 7/1995 | Kasahara et al. |
| 5,477,351 | A | 12/1995 | Takahara et al. |
| 5,915,051 | A | 6/1999 | Damask et al. |
| 6,295,402 | B1 | 9/2001 | Nakamura et al. |
| 6,643,424 | B2 | 11/2003 | Jacobowitz et al. |
| 6,721,473 | B1 | 4/2004 | Islam et al. |

(Continued)

FOREIGN PATENT DOCUMENTS

JP 2009-134232 A 6/2009

OTHER PUBLICATIONS

D. L. Brundrett et al., "Normal incidence guided mode resonant grating filters: design and experimental experimentation", Opt. Lett. 23, pp. 700-702 (1998).

(Continued)

*Primary Examiner* — Arnel C Lavarias
(74) *Attorney, Agent, or Firm* — Christopher G. Darrow; Young Basile Hanlon & MacFarlane P.C.

(57) ABSTRACT

A light switch (or valve) made up of two mutually inverted, substantially identical diffraction gratings with a liquid medium therebetween, arranged to allow the grating substrates to be shifted laterally relative to one another so as to align and mis-align the grating elements. When aligned, incident-polarized light passes through the switch and when mis-aligned, light does not pass through the switch but is reflected.

24 Claims, 9 Drawing Sheets

(56) References Cited

U.S. PATENT DOCUMENTS

| | | |
|---|---|---|
| 6,858,462 B2 | 2/2005 | Zaidi et al. |
| 6,885,789 B2 | 4/2005 | Liu |
| 7,187,836 B2 | 3/2007 | Kuo |
| 7,263,260 B2 | 8/2007 | Singh et al. |
| 8,072,684 B2 * | 12/2011 | Iizuka et al. ............ 359/576 |
| 2012/0075703 A1 * | 3/2012 | Iizuka et al. ............ 359/573 |

OTHER PUBLICATIONS

H. Iizuka et al., "Switching capability of double-sided grating with horizontal shift", App. Phys. Lett. 97, 053108, pp. 1-3 (2010).

T. S. Perry, "Tomorrow's TV—the grating light valve", IEEE Spectrum, 41, 38 (2004).

* cited by examiner

OPTICAL LIGHT SWITCH HAVING TWO INTERNALLY LOCATED DIFFRACTION GRATINGS SEPARATED BY LIQUID MEDIUM

RELATED APPLICATION INFORMATION

This application is a continuation-in-part of application Ser. No. 12/692,688, filed Jan. 25, 2010, "Optical Device Using Diffraction Grating". The entire contents of which are incorporated herein by reference.

FIELD OF THE INVENTION

This invention relates to optical switches using diffraction grating technology and more particularly to a switch comprising a double-sided grating made up of mutually inverted optical substrates with grating elements wherein said substrates are separated by a liquid medium so as to permit a relative horizontal shift between the two gratings.

BACKGROUND OF THE INVENTION

It is known that diffraction-based grating devices, sometimes called "splitters" or "dividers", can be constructed using materials of different diffraction indices and certain critical geometries. For example, a grating divider may comprise a periodic pattern of geometrically regular ridges and grooves in a substrate of fused $SiO_2$ in air. The ridges and grooves exhibit geometric characteristics including a period "p", a height "h" of the ridges, and a fill factor "r" which is the ratio of the width of the ridges to the period. Through selection of these parameters, it is possible to determine the degree to which light of various orders are transmitted and/or are trapped within the substrate. For example, a grating having a refraction angle in excess of the 43.6° critical angle for the $SiO_2$ air interface will trap±first order refraction components of incident polarized light. Details of a relevant grating divider can be found in the co-pending application Ser. No. 12/638,334 filed Dec. 15, 2009 and assigned to the assignees of this application, the entire content of which is incorporated herein by reference.

SUMMARY OF THE INVENTION

The present invention provides a variable transmittance optical system using two mutually inverted diffraction grating structures which can be shifted laterally relative to one another to control the degree to which light energy in a selected wavelength band is transmitted therethrough. In general, this is accomplished by arranging two diffraction grating structures of identical optical characteristics in mutually inverted series relationships separated by a liquid medium so that the gratings can be shifted laterally relative to one another. The shift is on the order of a fraction of one grating period and can be provided by, for example, piezoelectric or microelectromechanical systems (MEMS) to shift the optical system between a high transmittance state and a low transmittance state.

When arranged in a mutually inverted spaced-apart relationship in such a way as to allow a lateral shift between two gratings, the degree to which normal incident s-polarized light is transmitted through the system can be switched from more than about 95% (grating elements aligned) to less than about 5%. The invention can be implemented in various ways to act as a light valve or switch in various wavelength bands.

In one embodiment, the grating elements are arranged on the exterior of the mutually inverted grating substrates such that incident light enters the system by impingement on one set of elements and exits the system through the opposite set. In a first specific and illustrative geometry described below, the switched light falls in the wavelength band of between about 550 nm to 670 nm; i.e., within the human-visible band from near green to near red.

In another embodiment, the grating elements are brought much closer together by arranging them on the interior surfaces of the substrates; i.e., where they create boundaries with the intermediate liquid medium. In a second specific and illustrative geometry described below, the switched light falls within a wavelength band of about 1627 nm to 1485 nm, this providing a higher bandwidth capability.

The mechanisms for providing the lateral shift may vary considerably. In one practical arrangement the gratings or multiples thereof may be mounted strategically on structures which carry other structures or patterns, the degree of alignment between which is critical. In another arrangement, the shifting mechanisms may be in the form of piezoelectric devices or microelectromechanical systems (MEMS). In a still further embodiment, the shift producing elements may be devices with predetermined and precisely known coefficients of thermal expansion such that the degree of lateral alignment between the grating dividers and the consequential degree of visible light transmissivity therethrough varies as a function of temperature. Other types of transducers responsive to other quantities can also be used.

The invention and the various embodiments and applications thereof may be best understood from a reading of the following specification which is to be taken with the accompanying drawings. The term "light", as used herein, refers to periodic energy waveforms and is not restricted to those in the visible light range. The term "polarized light" refers to light either from a polarized source such as a laser or unpolarized light which has been passed through a polarizing filter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
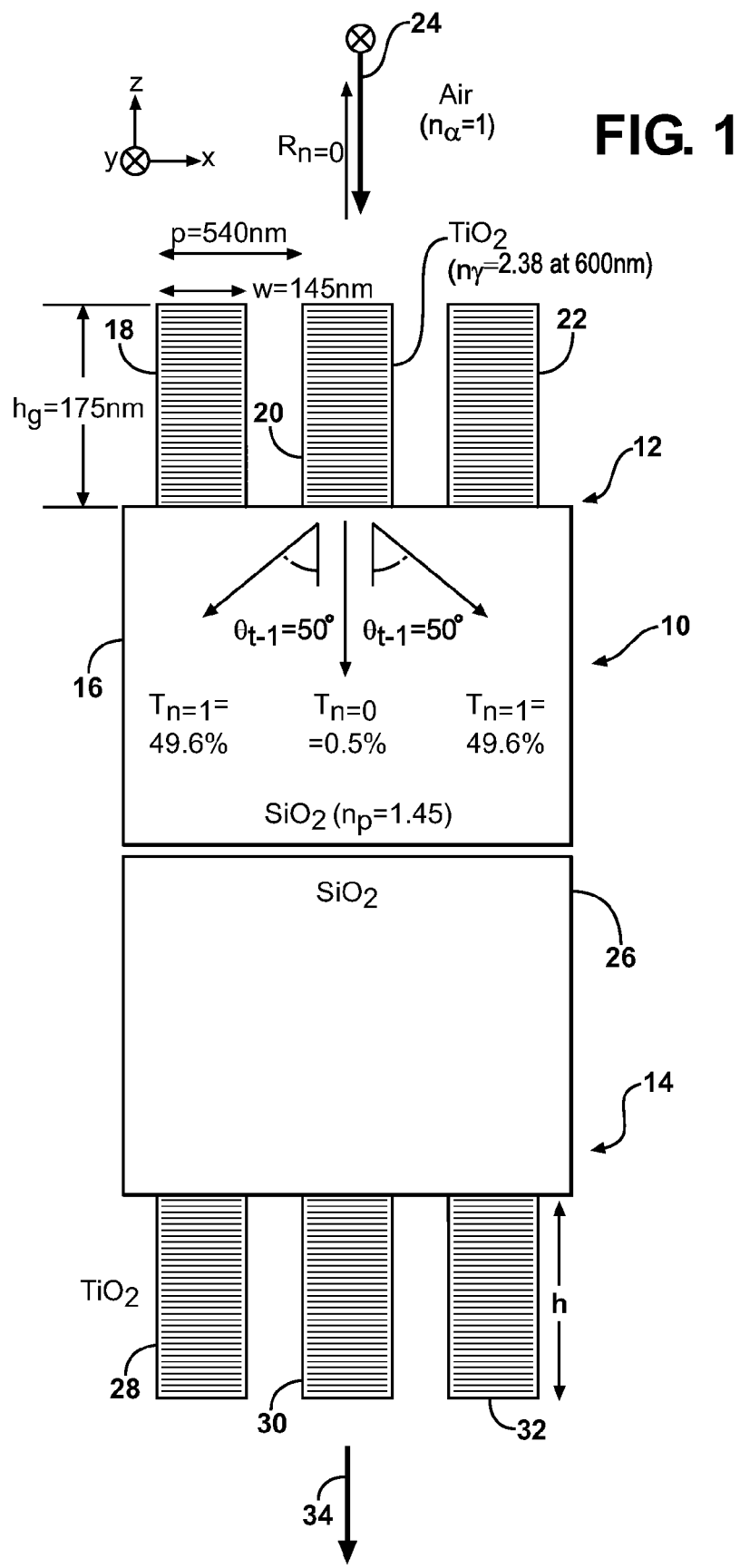
FIG. 1 is a diagram of a first double-sided diffraction grating demonstrating the principles of the present invention with the grating elements in lateral alignment so as to provide maximum transmissivity.

Referring to FIG. 1, there is shown a double-sided device 10 comprising mutually inverted and laterally aligned diffraction grating dividers 12, 14. Grating divider 12 comprises a substrate 16 of fused $SiO_2$ on which identical diffraction grating elements 18, 20, 22 made of $TiO_2$ are fused or mounted to the top surface of the substrate 16 in a regular periodic fashion so as to exhibit a period p of 540 nm, a height h of 175 nm and a width of 145 nm. The elements 18, 20, 22 are immersed in this case in air. Other surrounding media, including solid substances, can also be used. The fill factor r=0.27 can be determined by dividing the width w by the period p. The geometry is selected so as to produce a refraction angle in excess of the 43.6° critical angle of the $SiO_2$ air interface. In a practical embodiment, the period p may be in the range of about 0.87 to about 0.93$\lambda$, where $\lambda$ is the wavelength of the incident light 24, the fill factor r is in the range of about 0.22 to about 0.32 and h is in the range of about 0.24 to 0.34$\lambda$. As shown in FIG. 1, with these values, the first order refraction components are diffracted by an angle of approximately 50°, well above the critical angle.

The lower diffraction grating divider 14 comprises a substrate 26 of $SiO_2$ and periodically arranged $TiO_2$ grating elements 28, 30, 32 also immersed in air and having the exact same geometry as the grating elements 18, 20, 22. In other words, grating divider 14 is identical to grating divider 12 but is inverted. In the example of FIG. 1, light 24 may be thought as the input or incident light whereas light 34 is the output light which is transmitted through; i.e., the output light component when the transmittance or transmissivity of the device 10 is operating at the "on" level hereinafter described.

Figure 2:
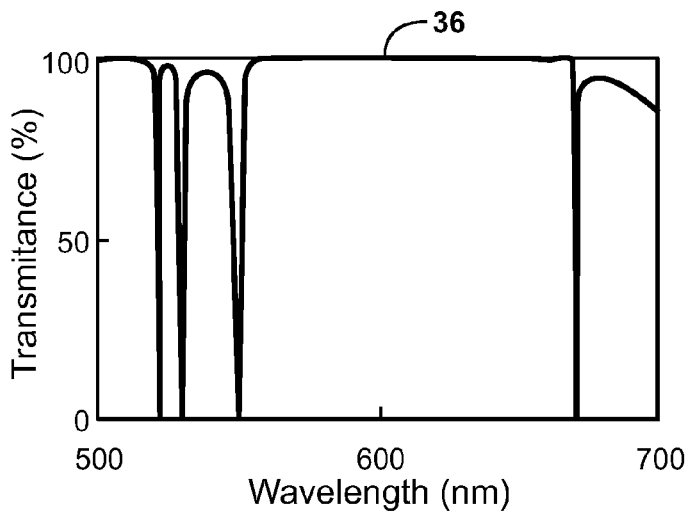
FIG. 2 is a graph of light wavelength vs. transmittance for the device of FIG. 1 in the aligned condition illustrated in FIG. 1.

FIG. 2 is a graphical illustration of the degree of the transmittance of the $0^{th}$ order of the s-polarized incident light 24 when the diffraction grating elements 18, 20, 22 of the upper diffraction grating divider 12 are fully laterally aligned with the grating elements 28, 30, 32 of the lower diffraction grating divider 14. The s-polarized light has the electric field in the y axis. Between about 550 nm and about 670 nm; i.e., in the "on" zone 36, the transmittance is in excess of 95%.

Figure 3:
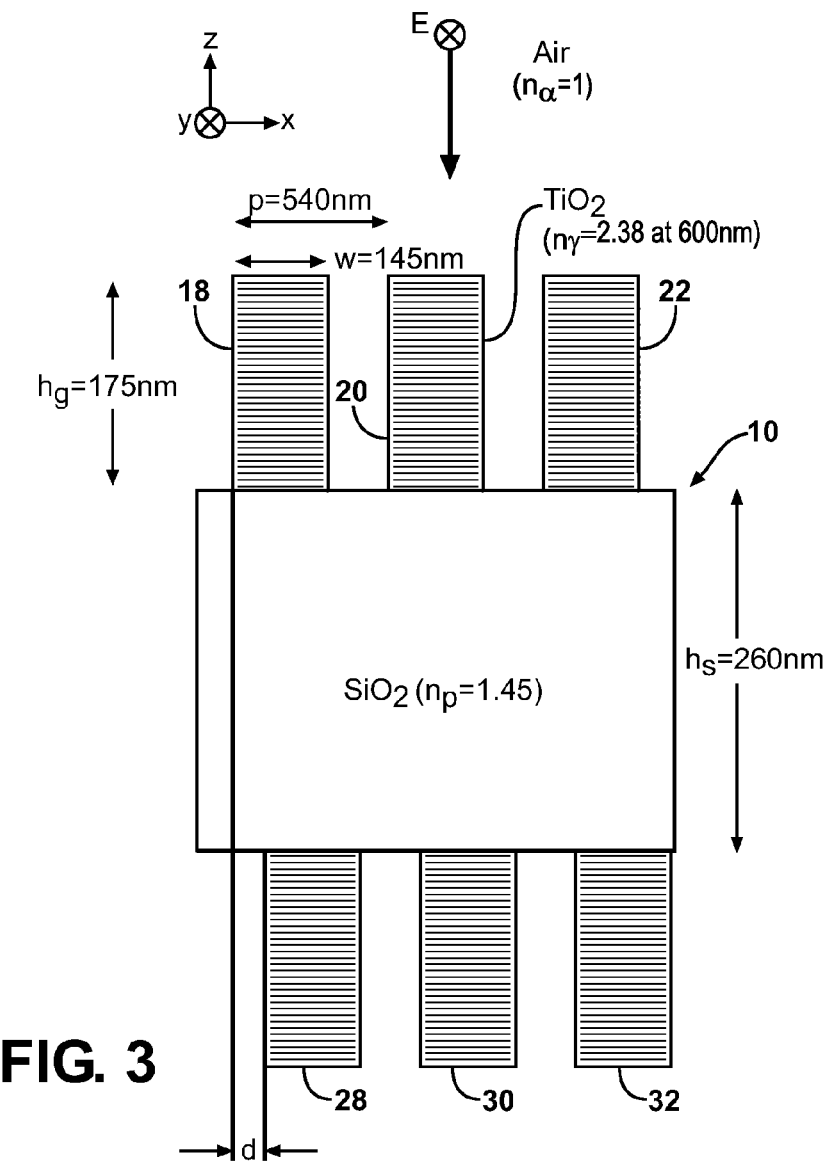
FIG. 3 is a diagrammatic illustration of the double-sided grating but with the grating elements shifted laterally by a distance d.
Figure 4:
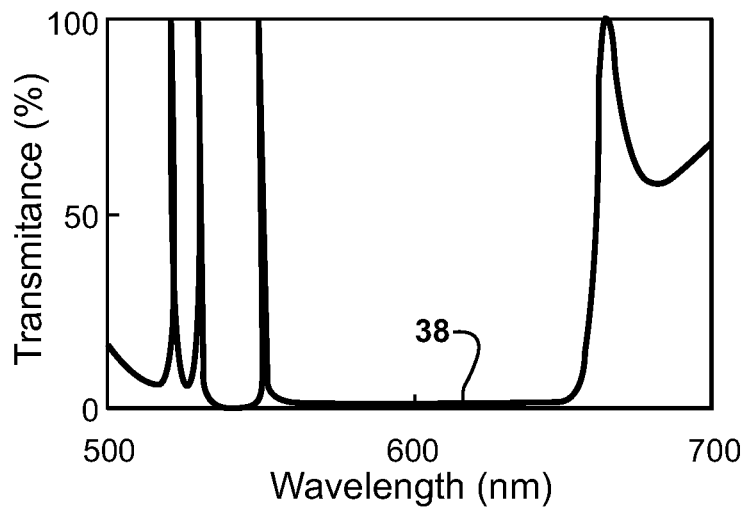
FIG. 4 is a graph of wavelength vs. transmittance for the double-sided grating of FIG. 3 in the shifted or non-aligned condition.

Looking now to FIG. 3, the double-sided grating divider device 10 is shown in the "off" condition wherein the lower grating elements 28, 30, 32 are shifted by a distance d relative to the upper grating elements 18, 20, 22 wherein d is approximately p/4. FIG. 4 shows that the transmittance of the $0^{th}$ order component of normal incident unpolarized light in the wavelength range between about 550 and 650 mm is in the "off" zone 38 wherein the transmittance is near 0; i.e., less than about 5%.

Figure 5:
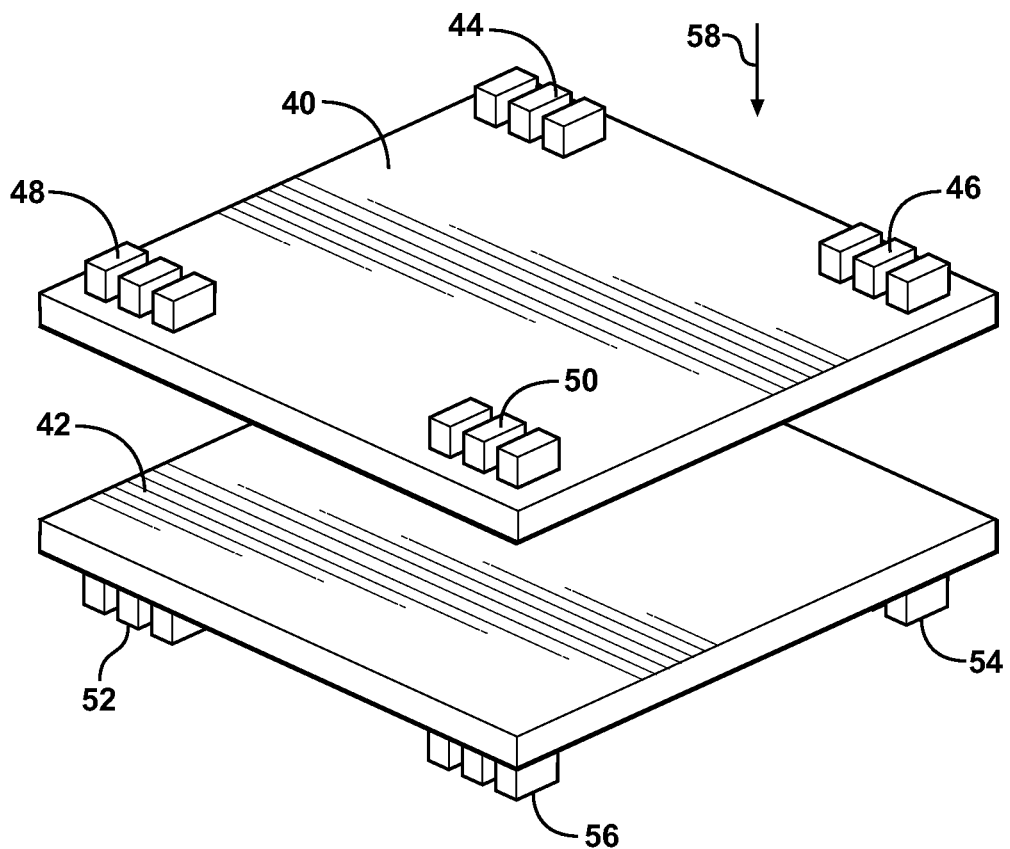
FIG. 5 is a perspective view of an alignment marker for a multi-layer fabrication process utilizing the principles and physical implementations of the present invention.

Referring to FIG. 5, there is shown a first practical application of the phenomenon of the present invention in an alignment marker for a $SiO_2$ multi-layer fabrication process. This device comprises an upper planar substrate 40 and, in spaced parallel relationship therewith a lower $SiO_2$ substrate 42. The upper substrate 40 carries $TiO_2$ grating elements 44, 46, 48, 50 in the four corners thereof arranged essentially in the fashion illustrated in FIGS. 1 and 3. The lower $SiO_2$ substrate 42 carries diffraction grating elements 52, 54, 56 and a fourth diffraction grating divider in the upper left hand corner as viewed in FIG. 5 which is obscured by the drawing. The diffraction grating elements 48, 52, for example, are arranged to be essentially in alignment with one another when the substrates 40, 42 are properly aligned but will be shifted relative to one another when the substrates are non-aligned along a lateral axis passing through and between the substrates 40, 42. A similar alignment situation exists for the grating elements 50, 56 and for the grating elements 46, 54 as well as the grating elements in the upper left hand corners which only the upper grating element 44 is visible.

Light 58 from a laser is directed normally toward the upper substrate 40 in such a way that when the grating elements are laterally aligned so as to exhibit the on condition represented by FIG. 2, the $0^{th}$ order incident light component passes or is transmitted substantially fully through to a detector to show the aligned condition. Conversely, when the substrates 40, 42 are not aligned, indicating an alignment error in the fabrication process, substantially no light from the laser 58 reaches the detector and the fabrication process is thereafter terminated or paused to make suitable alignment adjustments. Similar alignment detection can be achieved for the orthogonal axis.

Figure 6:
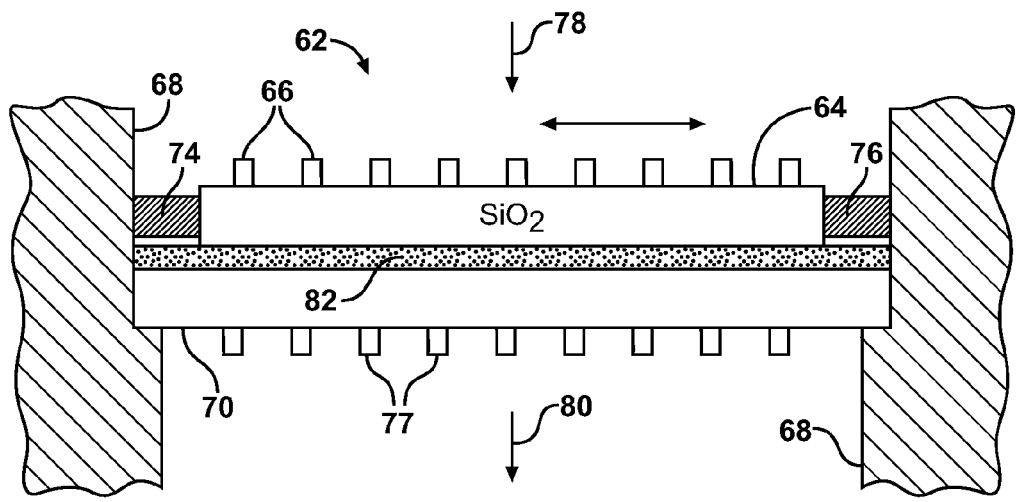
FIG. 6 is a cross-sectional view of a first optical switch using MEMS to shift the upper diffraction grating divider of the two mutually inverted diffraction gratings relative to the lower diffraction grating divider wherein a liquid crystal layer serves as a fluid interface between the two diffraction grating dividers.

Referring now to FIG. 6, there is shown an optical device in the form of an incident light valve or switch 62 comprising the combination of a planar upper $SiO_2$ substrate 64 carrying periodically arranged $TiO_2$ diffraction grating elements 66 and, in spaced parallel relationship thereto, a lower planar $SiO_2$ substrate with $TiO_2$ diffraction grating elements 77. The lower substrate 70 is fixed in a frame 68 whereas the upper substrate 64 is sandwiched between microelectromechanical systems (MEMS) devices 74, 76 so that the substrate 64 can be shifted relative to the lower substrate 70 to align and/or shift the diffraction grating elements 66, 77 to act as a valve whereby the incident light 78 is switched between a low transmissivity condition wherein the output light 80 is essentially 0 and a high transmissivity wherein the output light component 80 is nearly 100%. The lateral shifting of the substrates 64, 70 is facilitated by means of a liquid crystal layer 82 which lies in the space between the inverted substrates 64, 70 and has a refraction index of approximately 1.6. This layer can be replaced by an air layer with a refractive index of 1.

Figure 7:
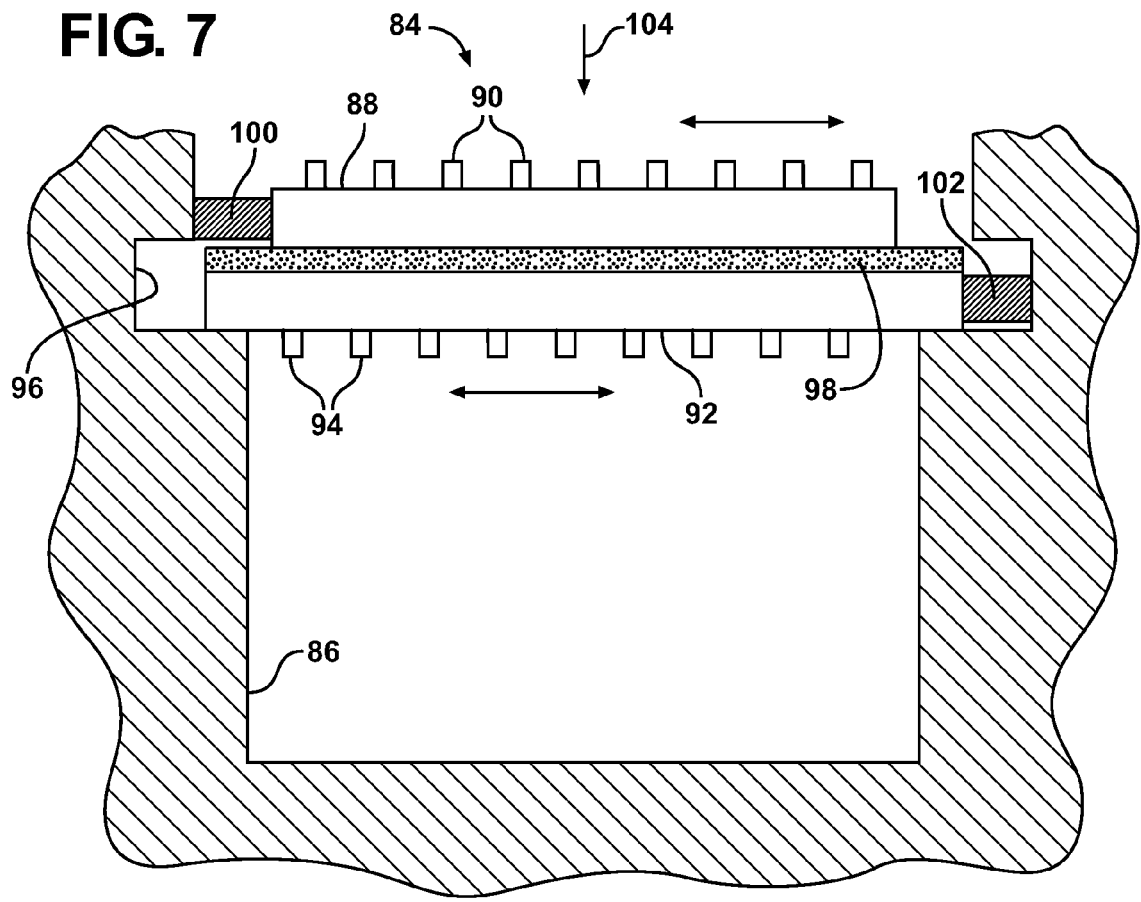
FIG. 7 is a diagrammatic illustration of a second application of the present invention in a switch for unpolarized sun

Referring to FIG. 7, there is shown a temperature sensitive skylight 84 for a room 86. The skylight 84 comprises an upper planar $SiO_2$ substrate 88 having periodically spaced diffraction grating elements 90 mounted to the upper surface thereof and exposed to incident sunlight 104. The thermally responsive skylight 84 further comprises a lower planar $SiO_2$ substrate 92 having diffraction grating elements 94 regularly arranged thereon in the fashion described above with respect to FIGS. 1 and 3. The two substrates 88, 92 are separated by a liquid crystal layer 98 which is suitably contained and which acts as an optically transparent bearing between the two substrates 88, 92 just as the layer 82 acts in the embodiment of FIG. 6.

Between a frame 96 and the left side of the substrate 88 is a metal element having a known coefficient of thermal expansion which responds to temperature changes to cause a lateral shift in the position of the substrate 88 relative to the adjacent frame 96. Similarly, a second element 102 is mounted between the frame 96 and the right edge of the substrate 92 so as to cause a shift in the lateral shift in that substrate and the grating elements 94 in response to ambient temperature changes. The two shifts created by the metal elements 100, 102 are cumulative and, when properly calibrated to achieve a shift of one-quarter of the period of the gratings 90, 94 over the temperature range of interest, can produce a valving or switching function wherein the incident sunlight 104 is fully transmitted into the room 86 under low temperature conditions but is essentially fully blocked when ambient temperature becomes high. The embodiment of FIG. 7 can be used with additional sputter-deposited filters for selected wavelengths.

Figure 8:
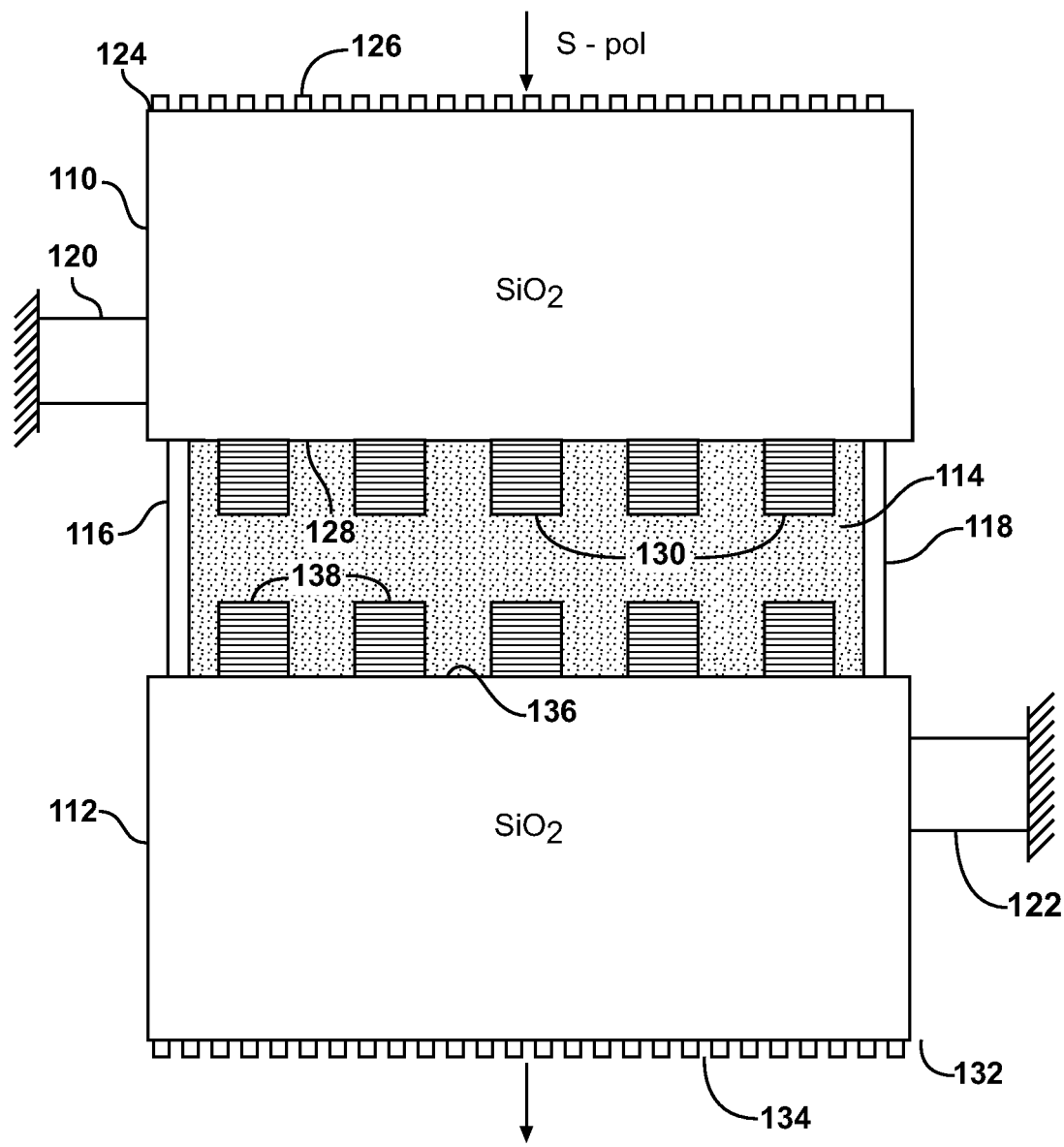
- FIG. 8 is a schematic drawing of a second embodiment of the switch with the grating elements in the aligned or "on" condition.
Figure 9:
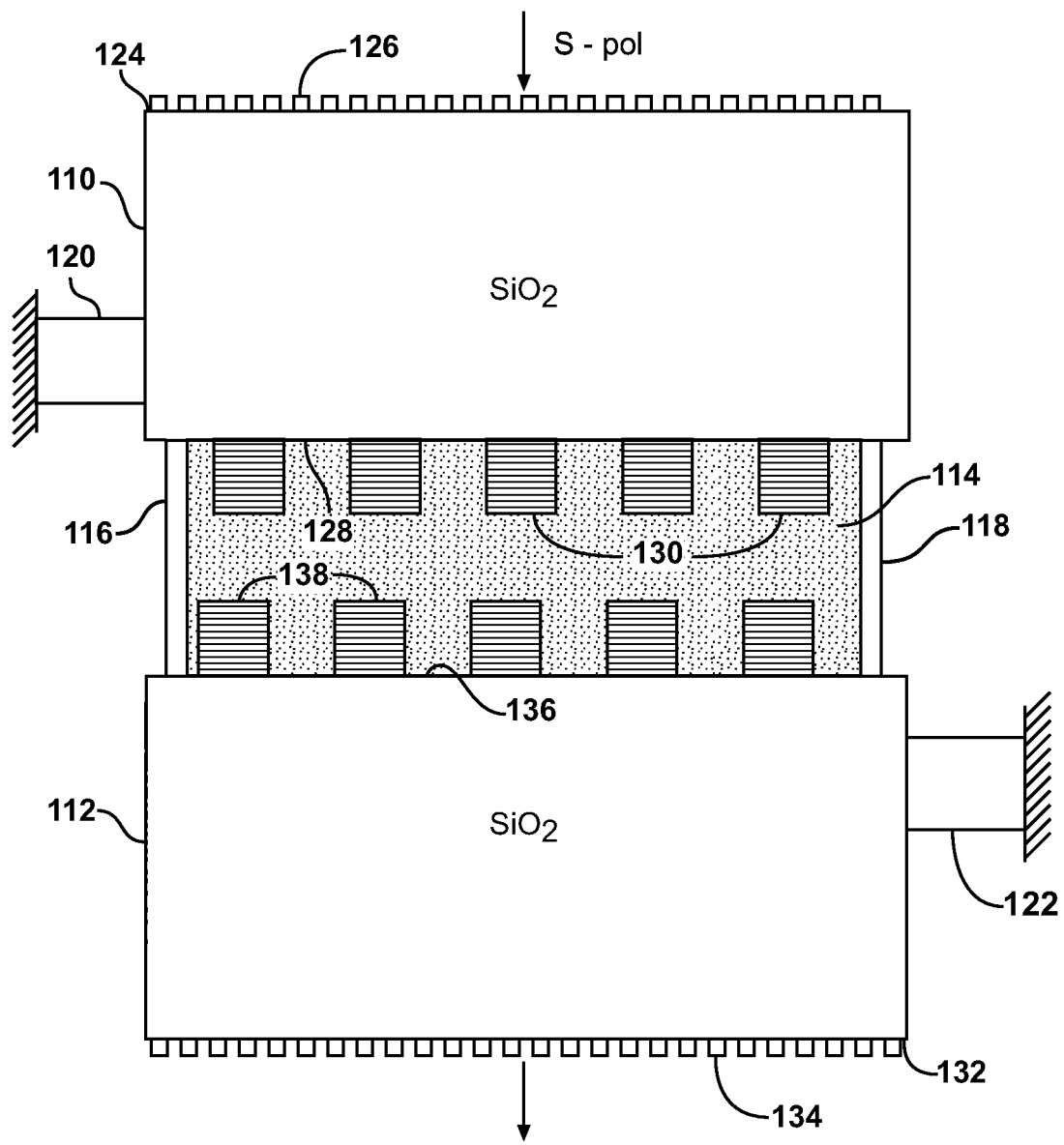
FIG. 9 is a schematic drawing of the FIG. 8 device in the shifted or "off" condition.

Referring now to FIGS. 8 and 9 there is shown a second embodiment of the optical switch comprising a top grating including an $SiO_2$ substrate 110, a bottom grating including a second $SiO_2$ substrate 112 and, between the substrates 110 and 112, a liquid medium 114 in the form of an organic solvent or hydrocarbon compound. The liquid medium 114 is held between the two substrates 110 and 112 by seals 116 and 118 which are arranged to permit relative lateral translation between the two substrates 110 and 112. This lateral shifting is provided by MEMS devices 120 and 122 which are connected between a stable mechanical ground and one side of each of the substrates 110 and 112 respectively. The gratings are identical as to grating height and periodicity as well as to materials of construction. They are, however, mutually inverted.

The exterior surface 124 of substrate 110 is provided with an anti-reflection grating 126 which represents the input surface onto which S-polarized light enters the device. The ridges and grooves in the anti-reflection grating are much closer together and much shallower than those of the grating elements on the substrates 110 and 112. The heights and sizes of all of the grating elements shown in the Figures are exaggerated for clarity.

Substrate 110 also has an interior surface 128 which is parallel to the exterior surface 124 and is in contact with the liquid medium 114. Arranged on the interior surface 128 and in contact with the liquid medium 114 and forming optical boundaries therewith are silicon grating elements 130 arranged from left to right with constant width and height and a constant period.

In a similar fashion, the bottom or inverted substrate 112 has an exterior surface 132 which has formed thereon an anti-reflection grating 134. Substrate 112 also exhibits an interior surface 136 which is parallel to the surface 132 and which has disposed thereon a plurality of silicon diffraction grating elements 138 with regular and constant width, height and periodicity, the quantities for the parameters for diffraction grating elements 138 being the same as those for diffraction grating elements 130.

In an illustrative embodiment, the refractive index of the $SiO_2$ substrates 110 and 112 is 1.45, the refractive index of the silicon grating elements 130 and 138 is 3.45, the grating element height is 490 nm, the width of the grating elements 130 and 138 is 350 nm and the grating period is 1,000 nm. Finally, the refractive index of the liquid medium 114 is 2 and the height of the medium 114 is 1,980 nm.

This establishes the following relationship:

$$n_{substrate} < n_{liquid\ layer} < n_{grating\ elements}.$$

With these parameters, the light which is switchable by the device shown in FIG. 8 falls within the wavelength band of about 1,465 nm to 1,627 nm; i.e. above the human visible range. FIG. 8 shows the switch in the ON or high transmittance condition.

Referring now specifically to FIG. 9, it can be seen that the devices 120 and 122 have been activated so as to shift the upper and lower substrates 110 and 112 laterally relative to one another by approximately one quarter of the period of the grating elements 130, 138. Whereas the device in the condition represented by FIG. 8 is in the ON state, the device as represented in FIG. 9 is in the OFF or low transmittance state brought about by the quarter period shift. The ON state is illustrated in FIG. 12 whereas the OFF state is illustrated in FIG. 13, both being graphs of wavelength along the horizontal axis and normal transmittance (as a percentage) along the ordinate axis.

Figure 10:
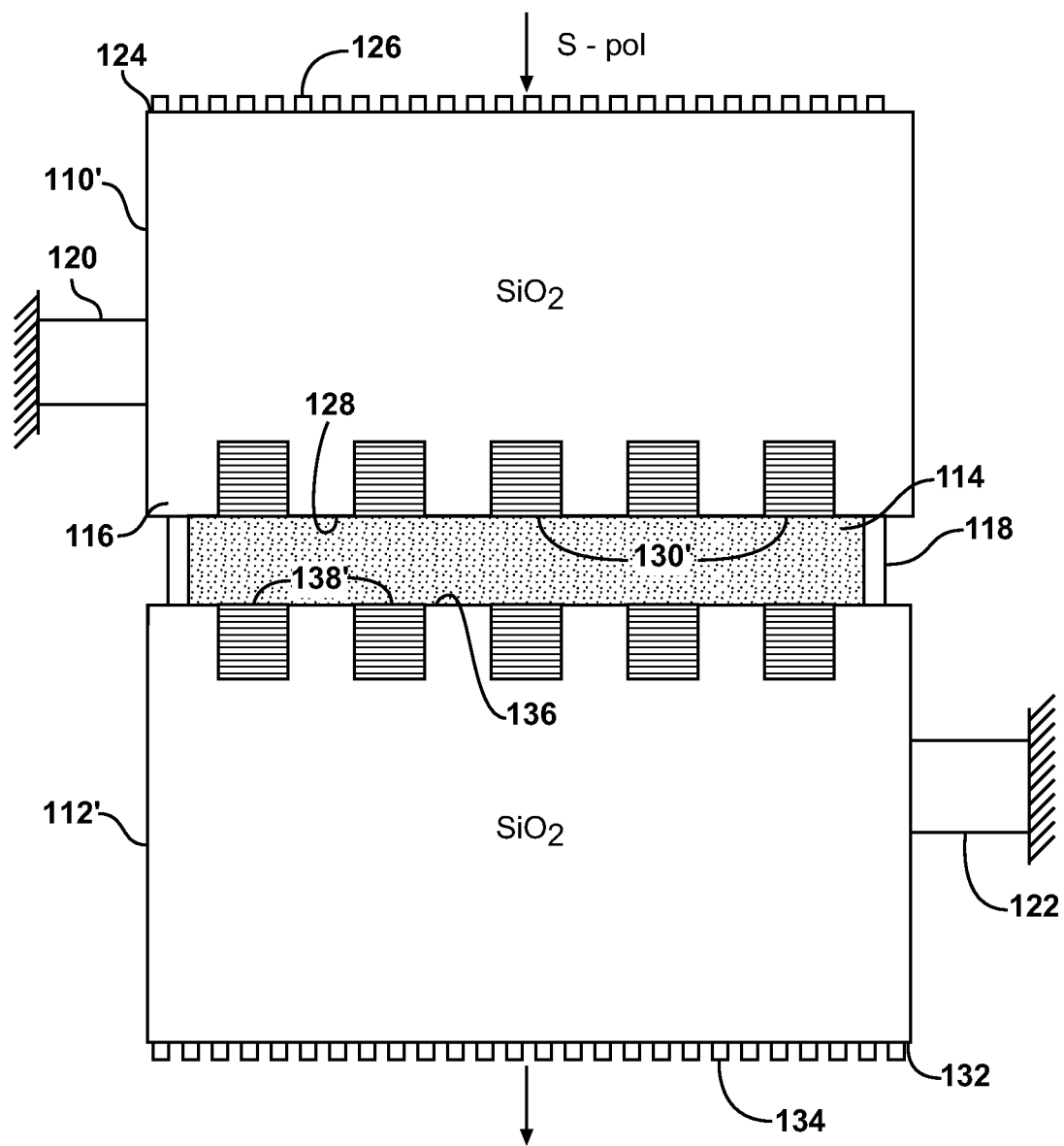
FIG. 10 is a schematic drawing of an alternative to the FIG. 8 devices wherein the grating elements are aligned to produce the "on" condition.
Figure 11:
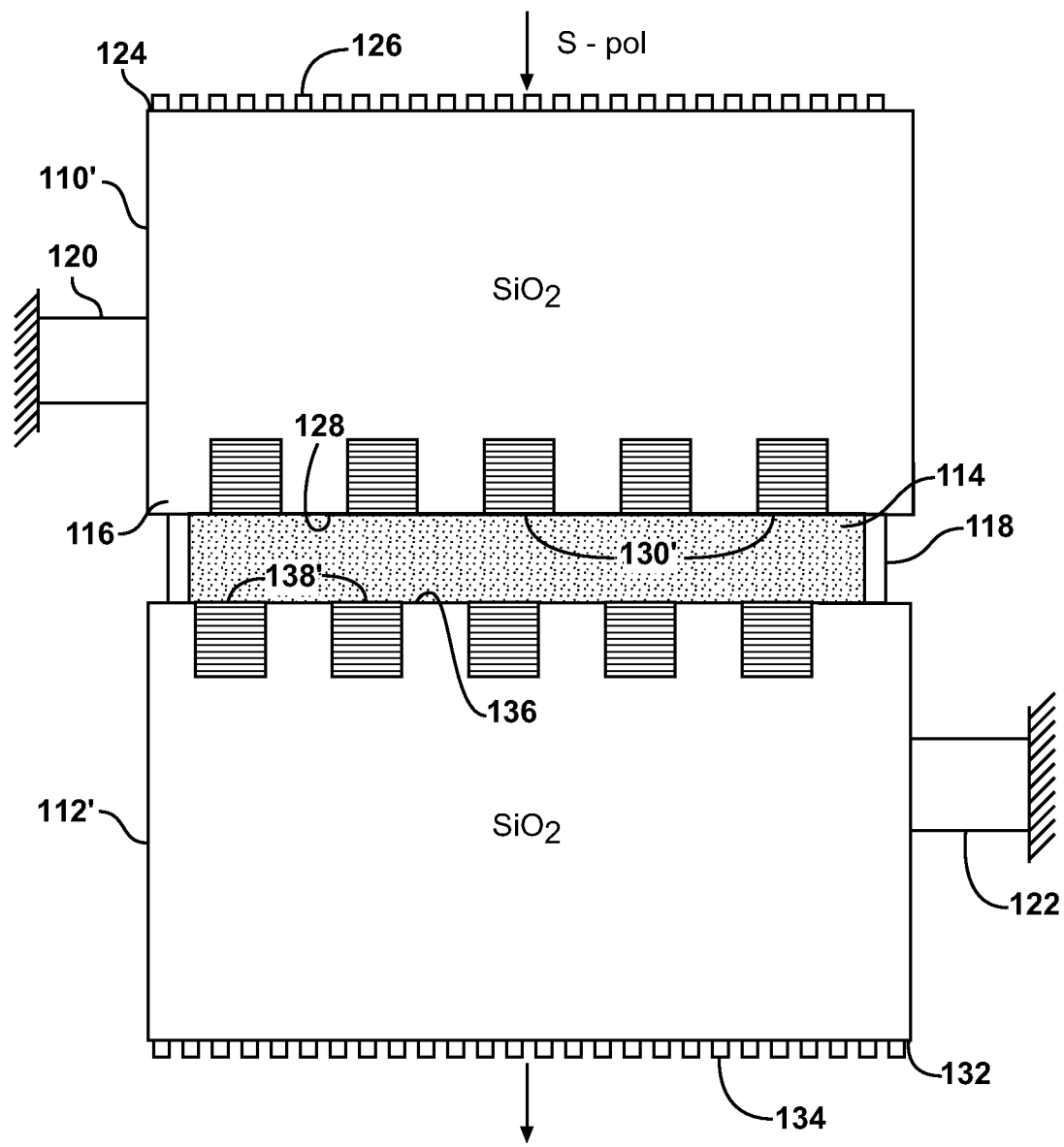
FIG. 11 is the device of FIG. 10 in the shifted or "off" state.

Referring to FIGS. 10 and 11, there is shown an alternative embodiment of the switch similar to the embodiment of FIGS. 8 and 9 in all relevant parameters except for the fact that the grating elements 130' and 138' are recessed into the interior surfaces of the upper and lower substrates 110' and 112'. FIG. 10 shows the switch in the ON state wherein the grating elements are in alignment. FIG. 11 shows the switch in the OFF state brought about by laterally shifting at least one of the grating substrates by one-quarter of the grating period.

Figure 12:
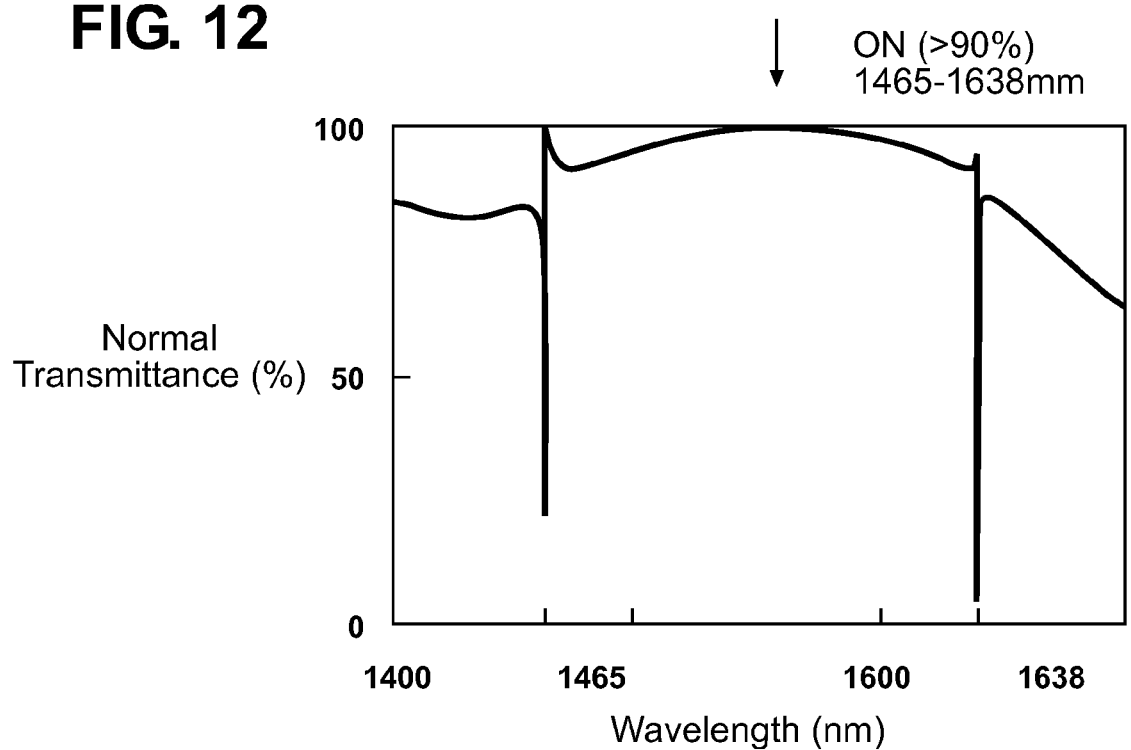
FIG. 12 is a graph showing the transmittance of the device in the condition of FIG. 8.
Figure 13:
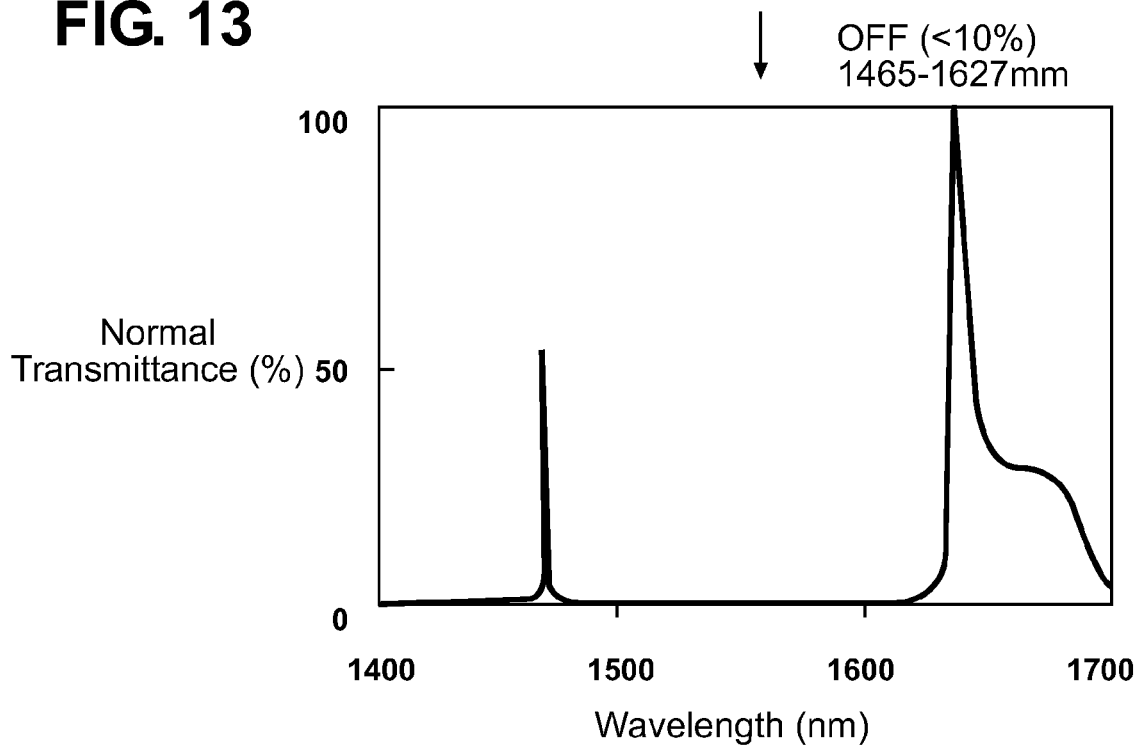
FIG. 13 is a graph showing the transmittance of the device in the FIG. 9 condition.

When the $SiO_2$ substrates need to be thick, the distance between the top and bottom gratings maintain in the second embodiments of FIGS. 8, 9, 10 and 11; i.e., the transmittance characteristics of FIGS. 12 and 13 maintain.

It is to be understood that the invention has been described with reference to specific materials and specific practical applications and that these descriptions are illustrative rather than limiting. For a definition of the invention reference should be taken to the accompanying claims.

What is claimed is:

1. A light switch comprising:
   first and second substrates, each composed of a first material having an index of refraction, $n_{substrate}$;
   first and second diffraction gratings located at surfaces of the first and second substrates, respectively, each diffraction grating comprising a set of periodic grating elements composed of a second material having an index of refraction, $n_{grating\ elements}$; and
   a liquid medium composed of a third material having an index of refraction, $n_{liquid\ layer}$;
   said first and second diffraction gratings having a lateral alignment relative to one another and being arranged in mutually inverted relationship with the liquid medium therebetween; wherein the lateral alignment of the first and second gratings may be varied to change an amount of incident light transmitted through the light switch;
   wherein the aforementioned indices of refraction are characterized by a relationship:

$$n_{substrate} < n_{liquid\ layer} < n_{grating\ elements}.$$

2. A light switch as defined in claim 1 wherein the grating elements are made of $TiO_2$.

3. A light switch as defined in claim 1 wherein the grating elements are made of silicon.

4. An optical device as defined in claim 1 wherein the substrates are made of $SiO_2$.

5. The light switch as defined in claim 1
wherein the first and second diffraction gratings are defined by successive ridges and grooves having a periodicity p, a height h and a fill factor r wherein p is in a range of about 0.87 to 0.93 λ, r is in a range of about 0.22 to 0.32 and h is in a range of about 0.24 to 0.34 λ; where λ is a wavelength of incident light.

6. A light valve comprising:
first and second mutually inverted diffraction gratings having a lateral alignment relative to one another and each comprising a substrate having exterior and interior surfaces, the substrate being formed of a first material having an index of refraction, $n_{substrate}$;
grating elements arranged on one of said surfaces of each substrate, the grating elements being formed of a second material having an index of refraction, $n_{grating\ elements}$;
a liquid medium separating the interior surfaces of the substrates, the liquid medium being formed of a second material having an index of refraction, $n_{fluid\ layer}$; and
means for shifting one of the substrates relative to the other so as to change the lateral alignment between the grating elements thereon and change a transmittance of the valve to incident polarized light;
wherein the aformentioned indices of refraction are characterized by a relationship:

$$n_{substrate} < n_{liquid\ layer} < n_{grating\ elements}.$$

7. A light valve as defined in claim 6 wherein the grating elements are arranged on the exterior surfaces of the substrates.

8. A light valve as defined in claim 6 wherein the grating elements are arranged on the interior surfaces of the substrates.

9. A light valve as defined in claim 7 wherein the gratings are characterized by parameters including a period, fill factor, and grating element height, said parameters being selected to switch light in its wavelength range of about 550 nm to 670 nm.

10. A light valve as defined in claim 8 wherein the gratings are characterized by parameters including a period, fill factor, and grating element height, said parameters being selected to switch light having a wavelength that falls within a range of 1465 nm through 1627 nm, inclusive.

11. A light valve as defined in claim 6 wherein the means comprises a thermal expansion device whereby the lateral alignment of the first and second mutually inverted diffraction gratings relative to one another is variable as a function of temperature.

12. A variably light-transmissive window comprising:
first and second diffraction gratings each made up of a distributed plurality of grating elements composed of a first material, mounted on a substrate composed of a second material wherein said diffraction gratings and grating elements have substantially identical geometries and produce a refraction angle greater than a critical angle created by an interface between the second material and said liquid medium;
said gratings being in contact with a liquid medium composed of a third material, the gratings having a lateral alignment relative to one another and being arranged in mutually inverted spaced-apart relationship with said liquid medium therebetween;
one side of the first diffraction grating providing an input surface to incident light, the corresponding side of the second diffraction grating providing an output surface to transmitted light; and
means for varying the lateral alignment between the grating elements of the first and second diffraction gratings thereby to vary a transmittance magnitude of the window with respect to at least one wavelength of incident light;
wherein the first material has an index of refraction, $n_{grating\ elements}$, the second material has an index of refraction, $n_{substrate}$, and the liquid medium has an index of refraction, $n_{liquid\ layer}$, the aforementioned indices of diffraction being described by a relationship:

$$n_{substrate} < n_{liquid\ layer} < n_{grating\ elements}.$$

13. A variably light-transmissive window as defined in claim 12 wherein the grating elements are formed of $TiO_2$.

14. A variably light-transmissive window as defined in claim 12 wherein the grating elements are formed of silicon.

15. A variable light-transmissive window as defined in claim 12 wherein the substrates are made of $SiO_2$.

16. A variable light-transmissive window as defined in claim 12 wherein the means for varying comprises at least one microelectromechanical system.

17. A variable light-transmissive window as defined in claim 12 wherein the means comprises a thermal expansion device whereby the variation in lateral alignment is a function of temperature.

18. A light valve comprising:
a first grating including a substrate with grating elements thereon;
a second grating including a substrate having grating elements thereon;
said first and second gratings being arranged in mutually inverted relationship with a liquid medium therebetween; and
means for shifting the substrates laterally relative to one another
wherein the grating elements have an index of refraction, $n_{grating\ elements}$, the substrates have an index of refraction, $n_{substrate}$, and the liquid medium has an index of refraction, $n_{liquid\ layer}$, the aforementioned indices of diffraction being described by a relationship:

$$n_{substrate} < n_{liquid} < n_{elements};$$

19. A light valve as defined in claim 18 wherein the gratings are defined by successive ridges and grooves having a periodicity, p, a height, h and a fill factor, r; wherein the light valve is characterized by a distance of separation, d, between the first and second gratings;
wherein the liquid medium is defined by an index of refraction wherein p is in a range of about 0.55 to 0.75 λ, r is in a range of about 0.25 to 0.45 and h is in a range of about 0.22 to 0.42 λ, the distance of separation, d, is in a range of about 1.18 to 1.38 λ, and $n_{liquid}$ is in a range of about 1.8 to 2.2.

20. An optical device comprising:
a first substrate composed of a first material having an index of refraction, $n_{substrate}$;
a first diffraction grating comprising grating elements composed of a second material having an index of refraction, $n_{grating\ elements}$, the first diffraction grating disposed at a surface of the first substrate;
a second substrate composed of the first material;
a second diffraction grating comprising grating elements composed of the second material, the second diffraction grating disposed at a surface of the second substrate; and a liquid medium, composed of a third material having an index of refraction, $n_{liquid\ layer}$, disposed between the first and second substrates and contacting the first and second diffraction gratings;

wherein the indices of diffraction of the first material, second material, and third material are described by a relationship:

$$n_{substrate} < n_{liquid} < n_{elements}.$$

21. The optical device of claim 20 wherein the first and second diffraction gratings have identical geometries characterized by a period of 1000 nm, a fill factor of 0.35, and a grating element height of 490 nm.

22. The optical device of claim 20 further comprising means for lateral shifting of the first and second substrates relative to one another, the lateral shifting operable to reversibly alternate the device between a first condition having >90% transmittance for a wavelength, $\lambda$, of incident light, and a second condition having <10% transmittance for the wavelength, $\lambda$, of incident light.

23. The optical device of claim 22 wherein $\lambda$ falls within a range of 1465 nm through 1627 nm, inclusive.

24. The optical device of claim 22 wherein the means for lateral shifting comprise a microelectromechanical system.

* * * * *

UNITED STATES PATENT AND TRADEMARK OFFICE
CERTIFICATE OF CORRECTION

Page 1 of 2

PATENT NO. : 8,976,450 B2
APPLICATION NO. : 13/079339
DATED : March 10, 2015
INVENTOR(S) : Hideo Iizuka et al.

It is certified that error appears in the above-identified patent and that said Letters Patent is hereby corrected as shown below:

Claims

In Column 6, Line 61, "$n_{substrate} < n_{liquid\ layer} < _{grating\ elements}$." should be "$n_{substrate} < n_{liquid\ layer} < n_{grating\ elements}$.".

In Column 7, Line 19, "$n_{fluid\ layer}$" should be "$n_{liquid\ layer}$".

In Column 7, Line 56, "produce a refraction angle" should be "produce a diffraction angle".

In Column 8, Line 12, "$n_{substrate} < n_{liquid\ layer} < _{grating\ elements}$." should be "$n_{substrate} < n_{liquid\ layer} < n_{grating\ elements}$.".

In Column 8, Line 15, "TiO$_2$" should be "TiO$_2$".

In Column 8, Line 18, "variable light transmissive" should be "variably light transmissive".

In Column 8, Line 20, "variable light transmissive" should be "variably light transmissive".

In Column 8, Line 24, "variable light transmissive" should be "variably light transmissive".

In Column 8, Line 29, "substrate with grating elements" should be "substrate having grating elements".

In Column 8, Line 44, "$n_{substrate} < n_{liquid\ layer} < n_{elements}$," should be "$n_{substrate} < n_{liquid\ layer} < n_{grating\ elements}$.".

In Column 8, Line 51, "wherein the liquid medium is defined by an index of refraction" should be deleted.

In Column 8, Line 55, "$n_{liquid}$" should be "$n_{liquid\ layer}$".

In Column 9, line 5, "indices of diffraction" should be "indices of refraction".

Signed and Sealed this
Twenty-fourth Day of November, 2015

Michelle K. Lee
*Director of the United States Patent and Trademark Office*

Claims

In Column 9, Line 9, "$n_{substrate} < n_{liquid\ layer} < n_{elements}$." should be "$n_{substrate} < n_{liquid\ layer} < n_{grating\ elements}$.".

In Column 9, Line 21, "$\lambda$falls" should be "$\lambda$ falls".